(12) United States Patent
Zhao et al.

(10) Patent No.: US 9,929,759 B1
(45) Date of Patent: Mar. 27, 2018

(54) INTEGRATED DUPLEXER

(71) Applicant: Marvell International Ltd., Hamilton (BM)

(72) Inventors: Yi Zhao, San Jose, CA (US); Renaldi Winoto, Danville, CA (US); Li Lin, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 167 days.

(21) Appl. No.: 14/843,934

(22) Filed: Sep. 2, 2015

Related U.S. Application Data

(60) Provisional application No. 62/045,354, filed on Sep. 3, 2014.

(51) Int. Cl.
  *H04J 1/00* (2006.01)
  *H04B 1/10* (2006.01)
  *H04L 5/14* (2006.01)

(52) U.S. Cl.
  CPC ............. *H04B 1/1036* (2013.01); *H04L 5/14* (2013.01)

(58) Field of Classification Search
  CPC .............................. H04B 15/005; H04B 1/40
  See application file for complete search history.

(56) References Cited

U.S. PATENT DOCUMENTS

| | | | | |
|---|---|---|---|---|
| 2013/0016633 | A1* | 1/2013 | Lum | H04B 1/0057 370/277 |
| 2013/0344835 | A1* | 12/2013 | Bakalski | H03H 7/0115 455/307 |
| 2015/0304059 | A1* | 10/2015 | Zuo | H04J 1/08 370/343 |
| 2016/0126982 | A1* | 5/2016 | Hayafuji | H04B 1/0483 370/328 |
| 2016/0353420 | A1* | 12/2016 | You | H04L 5/0053 |

* cited by examiner

*Primary Examiner* — Shukri Taha

(57) ABSTRACT

An apparatus includes a first circuit transmitting a first signal to a port, a second circuit receiving a second signal from the port, a first peak-notch filter coupled between the port and the first circuit and configured to pass the first signal and block the second signal, a second peak-notch filter coupled between the port and the second circuit and configured to pass the second signal and block the first signal, and a third filter coupled between an input of the first filter and a ground or between an output of the second filter and the ground. The first signal has a first frequency and the second signal has a second frequency that is different from the first frequency.

19 Claims, 7 Drawing Sheets ial Application No. 62/045,354, filed on Sep. 3, 2014,
INTEGRATED DUPLEXER

CROSS REFERENCE TO RELATED APPLICATION

This present disclosure claims the benefit of U.S. Provisional Application No. 62/045,354, filed on Sep. 3, 2014, which is incorporated by reference herein in its entirety.

BACKGROUND

Integration of many functions on a single chip, including fabricating analog and digital circuitry on the same die, is desirable in many applications of semiconductor technology, including RF communication devices. As a result, many components of an RF communication device have been integrated onto a System On Chip (SOC), including components such as power amplifiers (PAs), low-noise amplifiers (LNAs), and the like.

However, the RF communication device may include discrete duplexers, which are off-chip components. Even when the RF communication device includes a System-In-Package (SIP) which integrates one or more discrete duplexers into the same package as a semiconductor chip, such integrated duplexers may be expensive to fabricate and/or susceptible to limited transmitter-to-receiver (TX-RX) isolation and high insertion loss.

SUMMARY

In an embodiment, an apparatus includes a first circuit transmitting a first signal to a port, a second circuit receiving a second signal from the port, a first peak-notch filter coupled between the port and the first circuit and configured to pass the first signal and block the second signal, a second peak-notch filter coupled between the port and the second circuit and configured to pass the second signal and block the first signal, and a third filter coupled between an input of the first filter and a ground or between an output of the second filter and the ground. The first signal has a first frequency and the second signal has a second frequency that is different from the first frequency.

In an embodiment, the first circuit generates a third signal that is an undesired signal and has a third frequency substantially equal to the second frequency. The third filter is coupled between the input of the first filter and the ground, and the third filter provides a path to ground to a first portion of the third signal. An impedance presented to the third signal by the third filter is smaller than an impedance presented to the third signal by the first filter. The first filter receives a second portion of the third signal and attenuates the second portion of the third signal.

In an embodiment, the third filter is a peak-notch filter having a maximum impedance value at the first frequency and a minimum impedance value at the second frequency.

In an embodiment, the third filter includes a first parallel circuit having a capacitor and an inductor and the first parallel circuit has a maximum impedance value at the first frequency.

In an embodiment, the inductor is a first inductor, and the third filter further includes a second inductor coupled to the first parallel circuit in series. The third filter has a minimum impedance value at the second frequency.

In an embodiment, the apparatus further includes a fourth filter coupled between the output of the second filter and the ground. The fourth filter attenuates a portion of the first signal that passed through the second filter.

In an embodiment, the fourth filter is a peak-notch filter having a maximum impedance value at the second frequency and a minimum impedance value at the first frequency.

In an embodiment, the fourth filter includes a second parallel circuit having a capacitor and an inductor, and the second parallel circuit has a maximum impedance value at the second frequency.

In an embodiment, the capacitor is a first capacitor, and the fourth filter further includes a second capacitor coupled to the second parallel circuit in series. The fourth filter having a minimum impedance value at the first frequency.

In an embodiment, the first peak-notch filter includes a third parallel circuit including a first capacitor and a first inductor and a second capacitor coupled in series with the third parallel circuit.

In an embodiment, the third parallel circuit has a maximum impedance value at the second frequency, and the first peak-notch filter has a minimum impedance value at the first frequency.

In an embodiment, the second peak-notch filter includes a first inductor and a fourth parallel circuit including a first capacitor and a second inductor and coupled to the first inductor in series.

In an embodiment, the fourth parallel circuit has a maximum impedance value at the first frequency and the second peak-notch filter has a minimum impedance value at the second frequency.

In an embodiment, the first frequency is in a 1.75 GHz band for transmitting the first signal, and the second frequency is in a 2.15 GHz band for receiving the second signal.

In an embodiment, a method includes passing a first signal using a first peak-notch filter and blocking the first signal using a second peak-notch filter, passing a second signal using the second peak-notch filter and blocking the second signal using the first peak-notch filter, passing, by a third filter, a portion of a third signal from a transmitter circuit to ground. The first signal has a first frequency and the second signal has a second frequency that is different from the first frequency. The third signal is an undesired signal and has a third frequency substantially equal to the second frequency.

In an embodiment, the passed portion of the third signal corresponds to a first portion of the third signal, and the method further includes attenuating a portion of the first signal passed through the second filter using a fourth filter and attenuating a second portion of the third signal using the first filter.

In an embodiment, the third filter includes a parallel circuit having a capacitor and an inductor. The method further includes maximizing an impedance value of the parallel circuit at the first frequency.

In an embodiment, the inductor is a first inductor and the third filter further includes a second inductor coupled to the parallel circuit in series. The method further includes minimizing an impedance value of the third filter at the second frequency.

In an embodiment, the fourth filter includes a parallel circuit having a capacitor and an inductor. The method further includes maximizing an impedance value of the parallel circuit at the second frequency.

In an embodiment, the capacitor is a first capacitor and the fourth filter further includes a second capacitor coupled to the parallel circuit in series. The method further includes minimizing an impedance value of the fourth filter at the first frequency.

DETAILED DESCRIPTION

Figure 1:
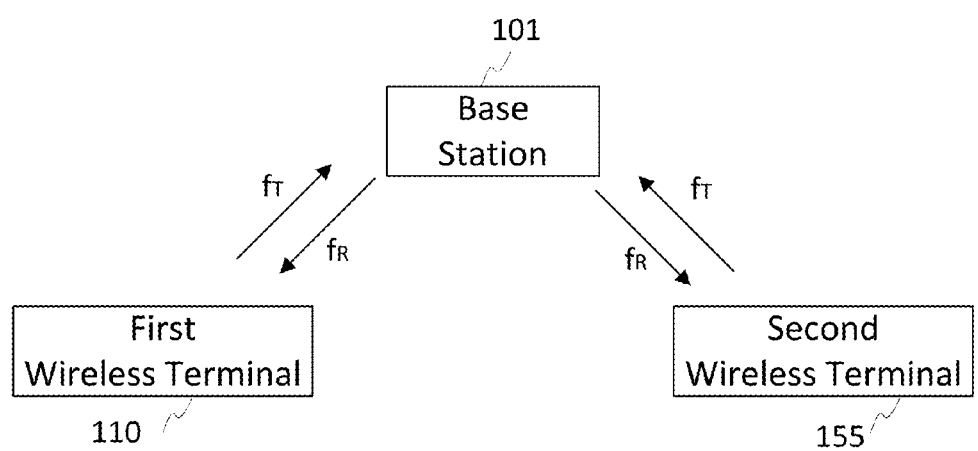
FIG. 1 illustrates two-way communication using frequency-division duplexing (FDD) between wireless devices.

FIG. 1 illustrates two-way communication using frequency-division duplexing (FDD) between a plurality of wireless devices, including a base station 101 and two wireless terminals 110 and 155. In an embodiment, the base station 101 may be a Node B (Node B), an evolved Node B (eNodeB), and the like, and the wireless terminals 110 and 155 may be a mobile station (MS) or user equipment (UE) such as a cell phone, laptop computer, tablet computer, wireless hot spot, and the like.

As shown in FIG. 1, the FDD communication employs two different frequency bands $f_T$ and $f_R$ for uplink and downlink communications, respectively, between the base stations 101 and the wireless terminals 110 and 155.

In order to simultaneously transmit and receive signals, one or more of the base station 101 and the wireless terminals 110 and 155 incorporate filters to isolate a corresponding transmit path from a corresponding receive path. Although FIG. 1 shows the wireless terminals 110 and 155 using two frequency bands $f_T$ and $f_R$, embodiments of the present disclosure are not limited thereto. For example, the FDD may be a multi-mode multi-band (MMMB) FDD that uses more than two frequency bands.

Figure 2:
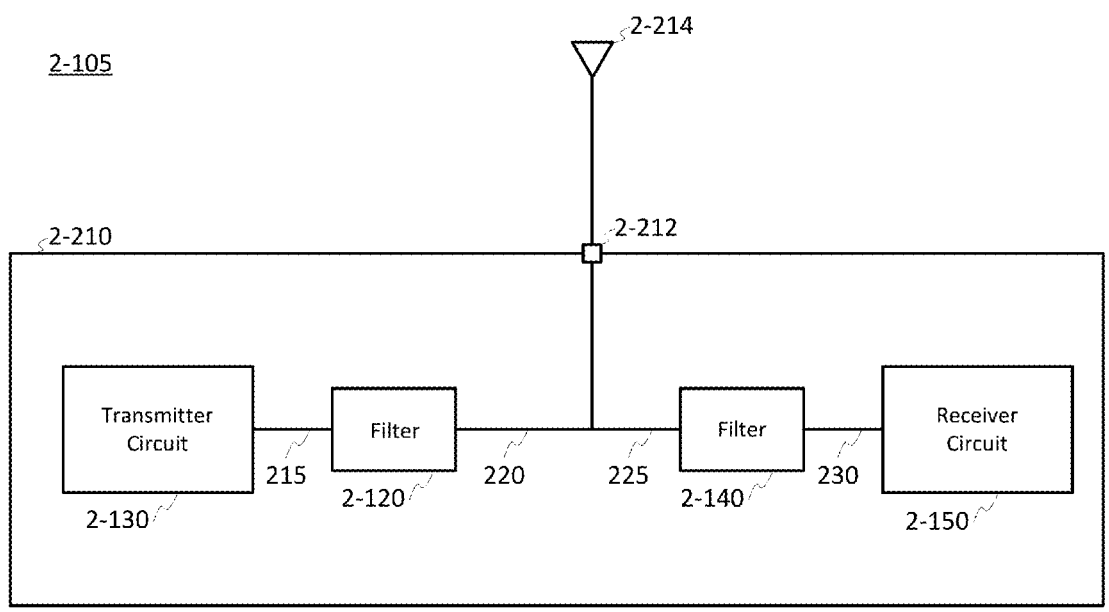
FIG. 2 is a block diagram of a portion of a wireless device according to an embodiment.

FIG. 2 is a block diagram of a portion 2-105 of a wireless device such as the base station 101 or wireless terminals 110 and 155 of FIG. 1, according to an embodiment. The portion 2-105 includes a System on Chip (SOC) 2-210 including a port 2-212 and an antenna 2-214 connected to the port 2-212. The SOC 2-210 has transmitter (TX) and receiver (RX) circuits 2-130 and 2-150, and first and second filters 2-120 and 2-140 configured to operate together as a duplexer, e.g., an on-chip duplexer.

The TX circuit 2-130 transmits signals in a first frequency band, which in an embodiment includes 1.75 GHz band radio-frequency signals. The RX circuit 2-150 receives signals in a second frequency band different from the first frequency band. In an embodiment, the second frequency band includes 2.15 GHz band radio-frequency signals. Although the TX circuit 2-130 and RX circuit 2-150 of the embodiment shown in FIG. 2 use the 1.75 GHz and 2.15 GHz band radio-frequency signals, respectively, embodiments of the present disclosure are not limited thereto.

The transmitter and receiver circuits 2-130 and 2-150 share the same antenna 2-214 through the port 2-212. The antenna 2-214 is suitable for transmitting signals in the first frequency band and receiving signals in the second frequency band. The first filter 2-120 couples the TX circuit 2-130 to the port 2-212 and the second filter 2-140 couples the RX circuit 2-150 to the port 212, in order to allow the TX and RX circuits 2-130 and 2-150 to share the antenna 2-214 connected to the port 2-212.

In an embodiment, a coaxial cable, a waveguide, a stripline, a shielded or unshielded twisted pair cable, or other such medium may be substituted for the antenna 2-214.

When the wireless device 2-105 transmits first signals in the first frequency band, the first filter 2-120 passes the first signals while the second filter 2-140 blocks the first signals. As a result, the first signals in the first frequency band are transmitted from the transmitter 2-130 to the antenna 2-214, but are not transmitted or are transmitted at a highly-attenuated signal level to the RX circuit 2-150. Accordingly, an interference by the transmitted first signals with reception of signals by the RX circuit 2-150 is reduced.

When the antenna 2-214 receives second signals in the second frequency band, the second filter 2-140 passes the second signals while the first filter 2-120 blocks the second signals. As a result, the second signals in the second frequency band are received by the RX circuit 2-150, but are not received or are received at a highly-attenuated signal level by the TX circuit 2-130. Accordingly, a diversion of energy associated with the received second signals to the TX circuit 2-130 is reduced and a receive sensitivity of the wireless device 2-105 is increased. In addition, when the TX circuit 2-130 generates undesired signals in the second frequency band (for example, noise or inter-modulation distortion components), the first filter 2-120 blocks the undesired signals in the second frequency band, and thus the signals in the second frequency band from the TX circuit 2-130 are not transmitted to the RX circuit 2-150 or are highly-attenuated. As a result, the receive sensitivity of the RX circuit 2-150 is not substantially decreased due to the undesired signals from the TX circuit 2-130.

In an embodiment, the first filter 2-120 includes a peak-notch filter, the peak-notch filter that has a peak in the first frequency band and a notch in the second frequency band. In the present disclosure, the "peak" of a peak-notch filter is defined as a narrow frequency range having low attenuation of signals presented to the peak-notch filter, and the "notch" of the peak-notch filter is defined as a narrow frequency range having high attenuation. Consequently, when a peak-notch filter is placed in series with a signal path, the peak may correspond to a first frequency region having a low impedance and the notch may correspond to a second frequency region having a high impedance. A narrow frequency range may be a frequency range from tens to hundreds of megahertz with a center frequency at which the peak-notch filter has a maximum or minimum impedance value. The narrow frequency range may be a fraction (e.g., one-half or one-third) of a difference between a frequency at which the peak-notch filter has the maximum impedance value and a frequency at which the peak-notch filter has the minimum impedance value.

The second filter 2-140 may include a peak-notch filter that has a peak in the second frequency band and a notch in the first frequency band. In an embodiment, each of the first and second filters 2-120 and 2-140 may include only passive filters, for example, filters comprising only passive components such as inductors, capacitors, resistors, and the like.

Figure 3A:
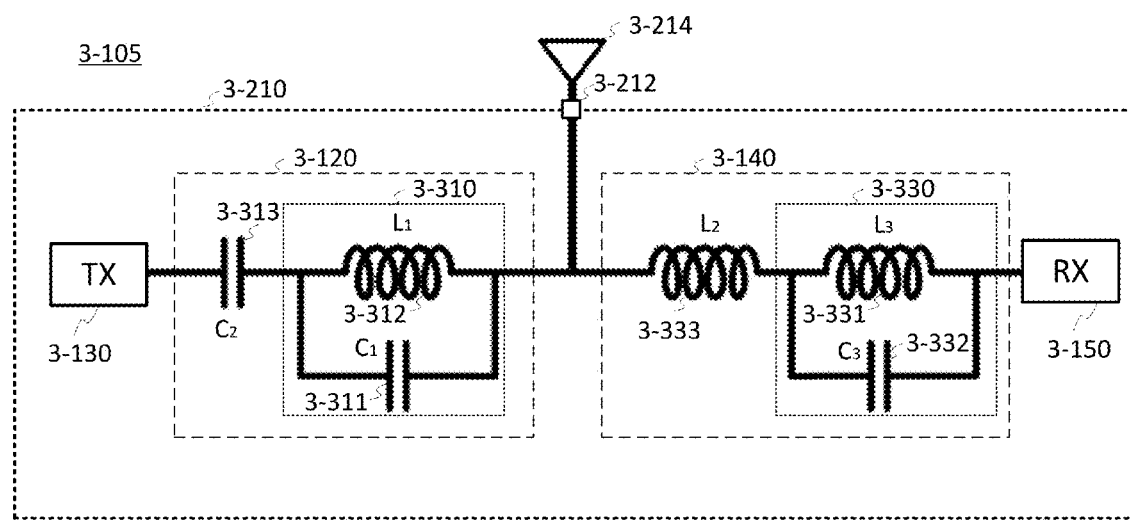
FIG. 3A is a first circuit diagram of the portion of FIG. 2 according to an embodiment.

FIG. 3A is a first circuit diagram of the portion 2-105 of FIG. 2 including an antenna 3-214 and an SOC 3-210, according to an embodiment. The SOC 3-210 includes a port 3-212, TX and RX circuits 3-130 and 3-150, and first and second filters 3-120 and 3-140. The antenna 3-214 is connected to the port 3-212 of the SOC 3-210.

The first filter 3-120 includes a first parallel LC circuit 3-310 that has a first inductor 3-312 and a first capacitor 3-311, and a second capacitor 3-313 coupled to the first parallel LC circuit 3-310 in series. Where $L_1$ denotes an inductance value measured in henries of the first inductor 3-312 and $C_1$ denotes a capacitance value measured in farads of the first capacitor 3-311, a first resonant frequency $f_1$ measured in hertz of the first parallel LC circuit 3-310 is expressed as follows:

$$f_1 = \frac{1}{2\pi\sqrt{L_1 C_1}}. \qquad \text{Equation 1}$$

In an embodiment, the inductance value $L_1$ ranges from 1 nH to 9 nH and the capacitance value $C_1$ ranges from 1 pF to 9 pF.

In this embodiment, the first parallel LC circuit 3-310 has the first resonant frequency $f_1$ that is substantially equal to a frequency in the second frequency band (e.g., the 2.15 GHz band.) For example, when the first resonant frequency $f_1$ is 2.15 GHz, the capacitance value $C_1$ is 3.66 pF, the inductance value $L_1$ is 1.5 nH, and the Q-factor of the first inductor 3-312 is 50.

At the first resonant frequency $f_1$, the total impedance of the first parallel LC circuit 3-310 has a maximum value, and therefore for a signal having the first resonant frequency $f_1$, a current flowing through the first parallel LC circuit 3-310 is minimized. As a result, the first filter 3-120 including the first parallel LC circuit 3-310 becomes substantially open, and stops or highly attenuates signals in the second frequency band. Thus, for example, when the TX circuit 3-130 generates undesired signals in the second frequency band (for example, noise or inter-modulation distortion components), the first filter 3-120 blocks the undesired signals in the second frequency band, and thus the signals in the second frequency band from the TX circuit 3-130 are not transmitted to the RX circuit 3-150 or are highly-attenuated.

When signals in the first frequency band (e.g., 1.75 GHz band radio-frequency signals) are transmitted from the transmitter circuit 3-130 to the first parallel LC circuit 3-310, an inductive reactance of the first inductor 3-312 decreases and capacitive reactances of the first and second capacitor 3-311 and 3-313 increase with the decrease in frequency. The first filter 3-120 including the first parallel LC circuit 3-310 and the second capacitor 3-313 has a minimum impedance at a second resonant frequency in hertz, which is expressed as follows:

$$f_2 = \frac{1}{2\pi\sqrt{L_1(C_1 + C_2)}}, \qquad \text{Equation 2}$$

where $C_2$ denotes a capacitance value in farads of the second capacitor 3-313. For example, when the second resonant frequency $f_2$ is 1.75 GHz and the inductance value $L_1$ and the capacitance value $C_1$ are 1.5 nH and 3.66 pF, respectively, the capacitance value $C_2$ is 1.86 pF.

At the second resonant frequency $f_2$, since a total impedance of the first filter 3-120 has a minimum value, a current flowing through the first filter 3-120 is a maximum. As a result, the first filter 3-120 becomes substantially a short and passes signals in the first frequency band with a minimum amount of attenuation.

The second filter 3-140 includes a second parallel LC circuit 3-330 and a second inductor 3-333 coupled to the second parallel LC circuit 3-330 in series. The second parallel LC circuit 3-330 includes a third inductor 3-331 and a third capacitor 3-332. Where $L_3$ denotes an inductance value in henries of the third inductor 3-331 and $C_3$ denotes a capacitance value in farads of the third capacitor 3-332, a third resonant frequency $f_3$ in hertz of the second parallel LC circuit 3-330 is expressed as follows:

$$f_3 = \frac{1}{2\pi\sqrt{L_3 C_3}}. \qquad \text{Equation 3}$$

In an embodiment, the inductance value $L_3$ ranges from 1 nH to 9 nH and the capacitance value $C_3$ ranges from 1 pF to 9 pF.

In this embodiment, the second parallel LC circuit 3-330 has the third resonant frequency $f_3$ that is substantially equal to a frequency in the first frequency band (e.g., the 1.75 GHz band.) For example, when the third resonant frequency $f_3$ is 1.75 GHz, the capacitance value $C_3$ is 5.52 pF, the inductance value $L_3$ is 1.5 nH, and the Q-factors of the third inductors 3-3-331 is 50. At the third resonant frequency $f_3$, since a total impedance of the second parallel LC circuit 3-330 has a maximum value, a current flowing through the second parallel LC circuit 3-330 is minimum. As a result, the second filter 3-140 including the second parallel LC circuit 3-330 becomes substantially open, and stops or substantially attenuates signals in the first frequency band.

When signals in the second frequency band (e.g., 2.15 GHz band radio-frequency signals) are received by the second parallel LC circuit 3-330 from the antenna 3-214, inductive reactances of the second and third inductors 3-333 and 3-331 increase and a capacitive reactance of the third capacitor 3-332 decreases with the increase in frequency. The second filter 3-140 including the second parallel LC circuit 3-330 and the second inductor 3-333 has a minimum impedance at a fourth resonant frequency in hertz, which is expressed as follows:

$$f_4 = \frac{1}{2\pi\sqrt{(L_2 \| L_3) * C_3}}, \qquad \text{Equation 4}$$

where $L_2$ denotes an inductance value in henries of the second inductor 3-333. For example, when the fourth resonant frequency $f_4$ is 2.15 GHz, the capacitance value $C_3$ and the inductance value $L_3$ are 5.52 pF and 1.5 nH, respectively, the inductance value $L_2$ is 2.95 nH.

At the fourth resonant frequency $f_4$, the total impedance of the second filter 3-140 has a minimum value, and therefore for a signal having the fourth resonant frequency $f_4$ a current flowing through the second parallel LC circuit 3-330 is maximized. As a result, the second filter 3-140 becomes substantially a short and passes signals in the second frequency band with a minimum amount of attenuation.

Figure 3B:
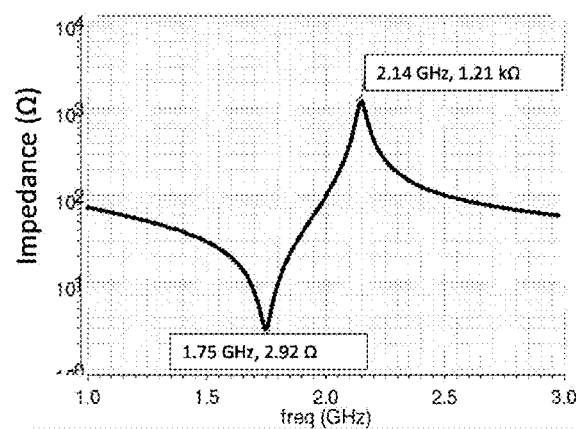
FIG. 3B illustrates impedance values of a first filter shown in FIG. 3A according to an embodiment.

Referring to FIG. 3B, FIG. 3B illustrates impedance values of the first filter 3-120 shown in FIG. 3A, which vary with frequencies of signals transmitted from the TX circuit 3-130 to the antenna 3-214, according to an embodiment. In the embodiment shown in FIG. 3B, a total impedance of the first filter 3-120 has a maximum value 1.21 kΩ at a frequency 2.14 GHz in the 2.15 GHz band. As a result, the first filter 3-120 including the first parallel LC circuit 3-310 highly attenuates 2.15 GHz band radio-frequency signals.

On the other hand, the total impedance of the first filter 3-120 has a minimum value 2.92Ω at a frequency 1.75 GHz in the 1.75 GHz band. As a result, the first filter 3-120 including the first parallel LC circuit 3-310 substantially passes 1.75 GHz band radio-frequency signals.

Figure 3C:
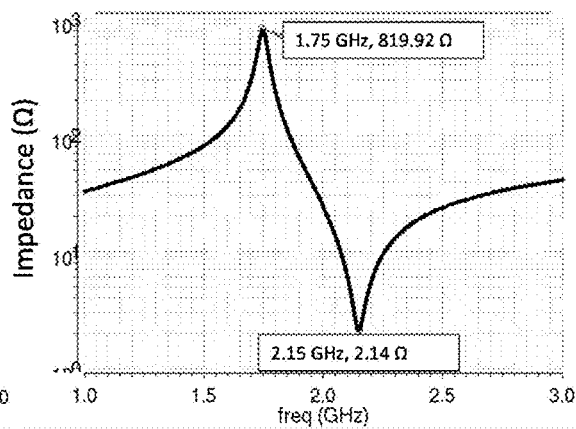
FIG. 3C illustrates impedance values of a second filter shown in FIG. 3A according to an embodiment.

Referring to FIG. 3C, FIG. 3C illustrates impedance values of the second filter 3-140 shown in FIG. 3A, which vary with frequencies of signals transmitted from the antenna 3-214 to the RX circuit 3-150, according to an embodiment. In the embodiment shown in FIG. 3C, a total impedance of the second filter 3-140, which corresponds to an impedance seen by signals propagating from the TX circuit 3-130 to the RX circuit 3-150, has a maximum value 819.92Ω at a frequency in the 1.75 GHz band. As a result, the second filter 3-140 including the second parallel LC circuit 3-330 highly attenuates 1.75 GHz band radio-frequency signals.

On the other hand, the total impedance of the second filter 3-140 has a minimum value 2.14Ω at a frequency in the 2.15 GHz band. As a result, the second filter 3-140 including the second parallel LC circuit 3-140 substantially passes 2.15 GHz band radio-frequency signals.

Figure 4:
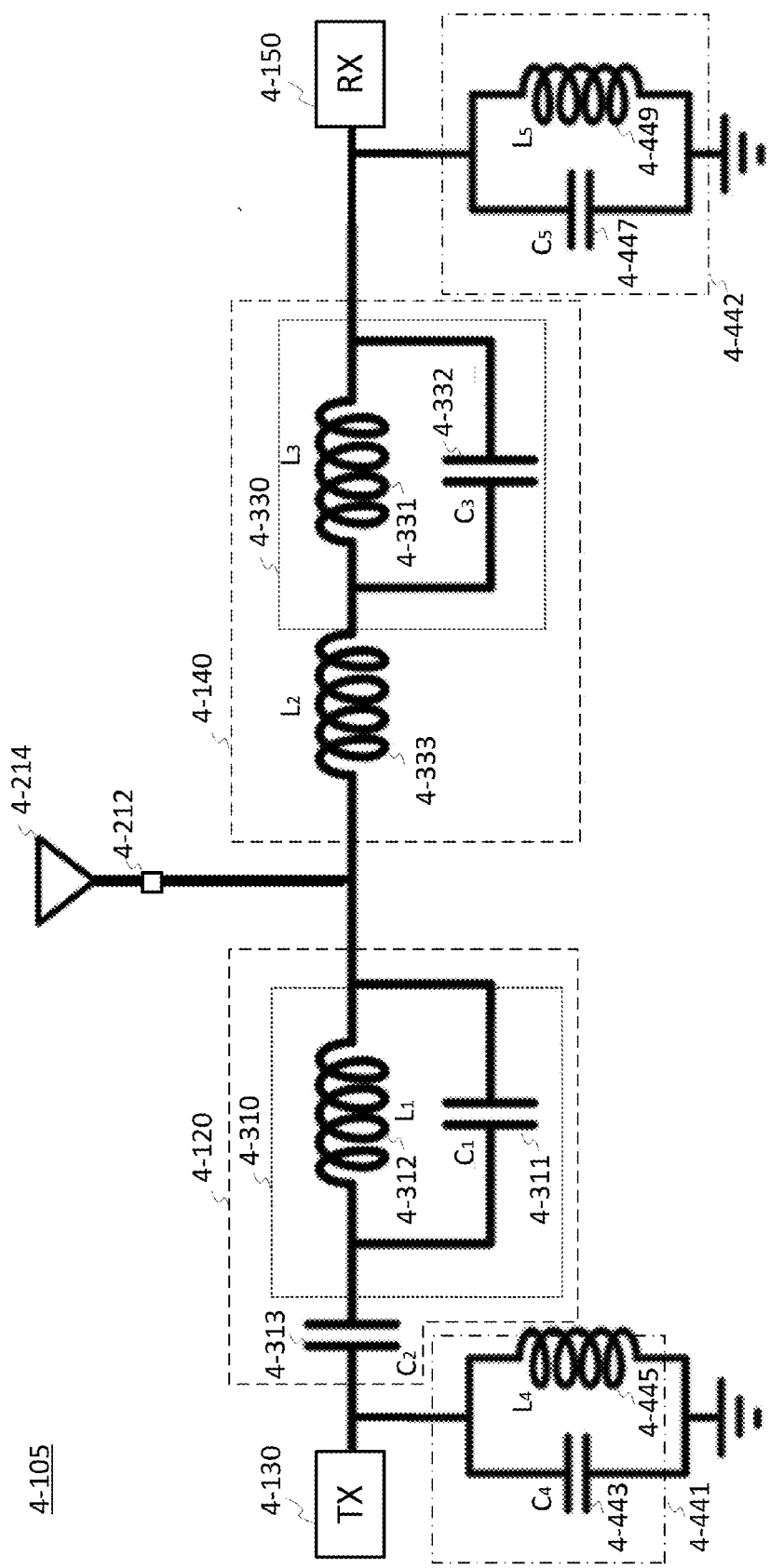
FIG. 4 is a second circuit diagram of the portion of FIG. 2 according to an embodiment.

FIG. 4 is a second circuit diagram of the portion 2-105 of FIG. 2 according to an embodiment. Elements of a portion 4-105 having reference characters of the form "4-XXX" correspond to similarly-numbered elements of the portion 3-105 of FIG. 3A. The portion 4-105 differs from the portion 3-105 by addition of a third parallel LC circuit 4-441 and a fourth parallel LC circuit 4-442.

The third parallel LC circuit 4-441 is coupled to a first terminal of a first filter 4-120 and a ground and includes a fourth capacitor 4-443 and a fourth inductor 4-445. Where $L_4$ denotes an inductance value measured in henries of the fourth inductor 4-445 and $C_4$ denotes a capacitance value measured in farads of the fourth capacitor 4-443, a fifth resonant frequency $f_5$ measured in hertz of the third parallel LC circuit 4-441 is expressed as follows:

$$f_5 = \frac{1}{2\pi\sqrt{L_4 C_4}}. \qquad \text{Equation 5}$$

In this embodiment, the third parallel LC circuit 4-441 has the fifth resonant frequency $f_5$ that is substantially equal to a frequency in the first frequency band (e.g., the 1.75 GHz band.) At the fifth resonant frequency $f_5$, a total impedance of the third parallel LC circuit 4-441 has a maximum value and a total impedance of the first filter 4-120 has a minimum value. For example, when the fifth resonant frequency $f_5$ is 1.75 GHz, the total impedance of the third parallel LC circuit 4-441 is 823.2Ω and the total impedance of the first filter 4-120 is 2.92Ω. As a result, a current flowing through the third parallel LC circuit 4-441 is at a minimum, and the first filter 4-120 including the first parallel LC circuit 4-310 substantially passes signals in the first frequency band.

At a frequency in the second frequency band (e.g., the 2.15 GHz band), the total impedance of the first filter 4-120 has a maximum value, and thus the first filter 4-120 including the first parallel LC circuit 4-310 highly attenuates signals in the second frequency band. At the frequency in the second frequency band, the total impedance of the third parallel LC circuit 4-441 decreases as a frequency becomes farther away from the fifth resonant frequency $f_5$. The third parallel LC circuit 4-441 has such a low value (e.g., 39.6Ω at 2.15 GHZ) of the total impedance, when the TX circuit 4-130 generates undesired signals in the second frequency band, a portion of the undesired signals would pass through the third parallel LC circuit 4-441 to the ground. The first filter 4-120 receives a remaining portion of the undesired signals and further attenuates the received portion of the undesired signals. As a result, TX-to-RX isolation between the TX and RX circuits 4-130 and 4-150 is improved.

The fourth parallel LC circuit 4-442 is coupled to a first terminal of a second filter 4-140 and the ground, and includes a fifth capacitor 4-447 and a fifth inductor 4-449. Where $L_5$ denotes an inductance value measured in henries of the fifth inductor 4-449 and $C_5$ denotes a capacitance value measured in farads of the fifth capacitor 4-447, a sixth resonant frequency $f_6$ measured in hertz of the fourth parallel LC circuit 4-442 is expressed as follows:

$$f_6 = \frac{1}{2\pi\sqrt{L_5 C_5}}. \qquad \text{Equation 6}$$

In this embodiment, the fourth parallel LC circuit 4-442 has the sixth resonant frequency $f_6$ that is substantially equal to a frequency in the second frequency band (e.g. the 2.15 GHz band.) At the sixth resonant frequency $f_6$, a total impedance of the fourth parallel LC circuit 4-442 has a maximum value. For example, at 2.15 GHz, the total impedance of the fourth parallel LC circuit 4-442 is 1.22 kΩ and that of the second filter 1-140 is 2.14Ω As a result, when the second filter 4-140 including the second parallel LC circuit 4-330 substantially passes signals in the second frequency band, a current flowing through the fourth parallel LC circuit 4-442 is at a minimum.

At a frequency in the first frequency band (e.g. a 1.75 GHz band), the total impedance of the second filter 4-140 has a maximum value, and thus the second filter 4-140 including the second parallel LC circuit 4-330 highly attenuates signals in the first frequency band. At the frequency in the first frequency band, the total impedance of the fourth parallel LC circuit 4-442 decreases as a frequency becomes farther away from the sixth resonant frequency $f_6$. Since the fourth parallel LC circuit 4-442 has such a low value (e.g., 49.1Ω at 1.75 GHz) of the total impedance, even assuming that a portion of the signals in the first frequency band pass through the second filter 4-140, the passed portion would pass through the fourth parallel LC circuit 4-442 to the ground and thus be further attenuated.

Figure 5A:
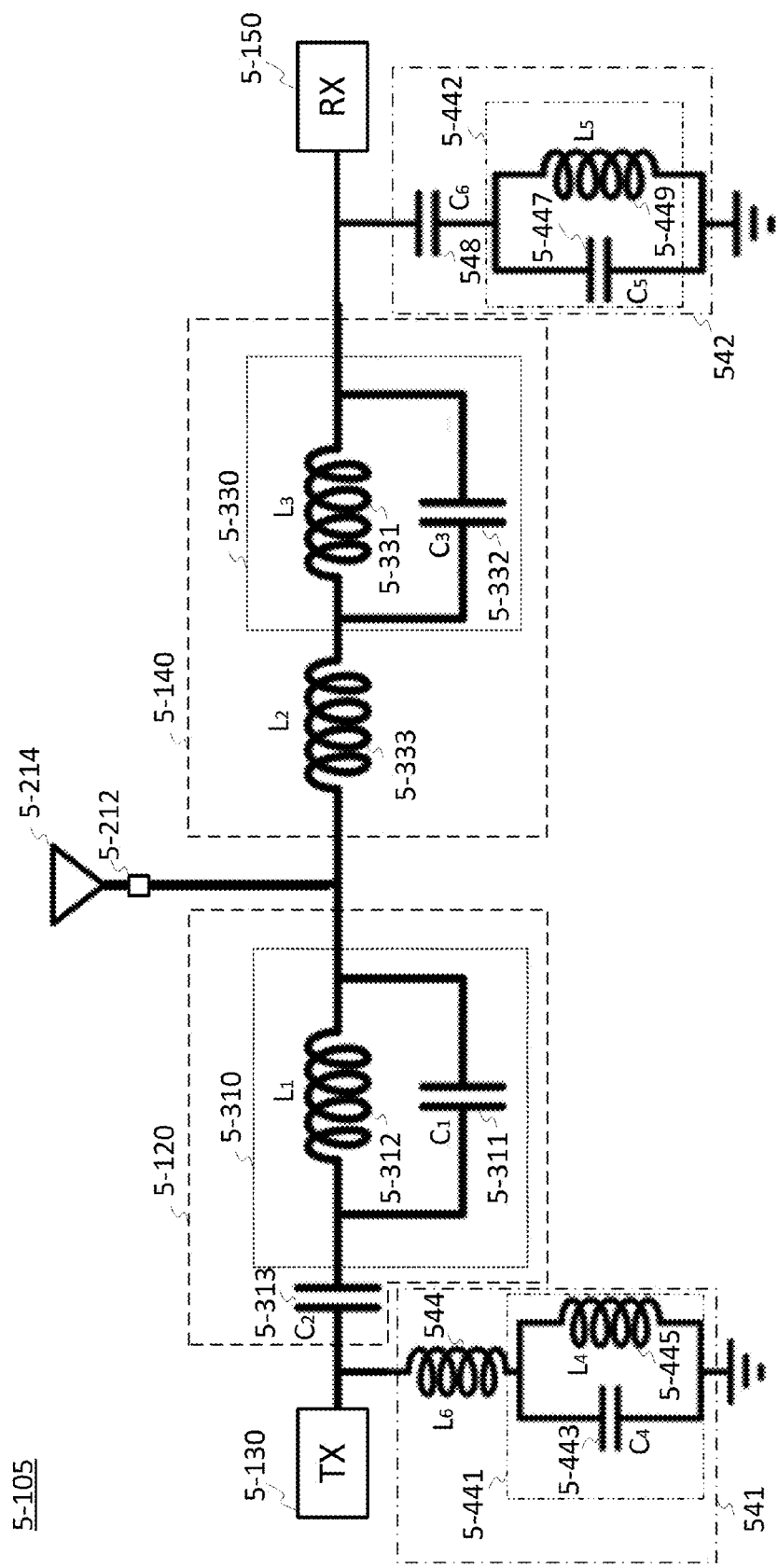
FIG. 5A is a third circuit diagram of the portion of FIG. 2 according to an embodiment.

FIG. 5A is a third circuit diagram of the portion 2-105 of FIG. 2, according to an embodiment. Elements of a portion 5-105 having reference characters of the form "5-XXX" correspond to similarly-numbered elements of the portion 3-105 of FIG. 3A. The portion 5-105 differs from the portion 3-105 by addition of a third filter 541 and a fourth filter 542.

The third filter 541 is coupled to a first terminal of a first filter 5-120 and a ground. The third filter 541 includes a third parallel LC circuit 5-441 having a fourth inductor 5-445 and a fourth capacitor 5-443, and a sixth inductor 544 coupled to the third parallel LC circuit 5-441 in series. Where $L_4$ denotes an inductance value measured in henries of the fourth inductor 5-445 and $C_4$ denotes a capacitance value measured in farads of the fourth capacitor 5-443, the third parallel LC circuit 5-441 has the fifth resonant frequency $f_5$ measured in hertz of is expressed in the above Equation 5.

In this embodiment, the third parallel LC circuit 5-441 has the fifth resonant frequency $f_5$ that is substantially equal to a frequency in the first frequency band (e.g., the 1.75 GHz band.) At the fifth resonant frequency $f_5$, a total impedance of the third filter 541 has a maximum value and a total impedance of a first filter 5-120 has a minimum value. As a result, a current flowing through the third filter 541 is minimum, and the first filter 5-120 passes signals in the first frequency.

At a frequency in the second frequency band (e.g. the 2.15 GHz band), the total impedance of the first filter 5-120 has a maximum value, and thus the first filter 5-120 highly attenuates signals in the second frequency band. At the frequency in the second frequency band, the total impedance of the third filter 541 has a minimum value. In an embodiment, the third filter 541 has substantially the same configuration as that of the second filter 5-140 except that a first terminal of the third filter 541 is connected to the TX circuit 5-130 and a second terminal of the third filter 541 is connected to ground. Thus, when the TX circuit 5-130 generates undesired signals in the second frequency band, a portion of these undesired signals would pass through the third filter 541 to the ground. The first filter 5-120 receives a remaining portion of the undesired signals and further attenuates the received portion of the undesired signals. As a result, TX-to-RX isolation between the TX and RX circuits 5-130 and 5-150 is improved.

The fourth filter 542 is coupled to a first terminal of a second filter 5-140 and the ground. The fourth filter 542 includes a fourth parallel LC circuit 5-442 having a fifth inductor 5-449 and a fifth capacitor 5-447, and a sixth capacitor 548 coupled to the fourth parallel circuit 5-442 in series. Where $L_5$ denotes an inductance value measured in henries of the fifth inductor 5-449 and $C_5$ denotes a capacitance value measured in farads of the fifth capacitor 5-447, the fourth parallel LC circuit 5-442 has the sixth resonant frequency $f_6$ measured in hertz of is expressed in the above Equation 6.

In this embodiment, the fourth parallel LC circuit 5-442 has the sixth resonant frequency $f_6$ that is substantially equal to a frequency in the second frequency band. At the sixth resonant frequency $f_6$, a total impedance of the fourth filter 542 has a maximum value and a total impedance of the second filter 5-140 has a minimum value. As a result, when the second filter 5-140 passes signals in the second frequency band, a current flowing through the fourth filter 542 is at a minimum.

At a frequency in the first frequency band, the total impedance of the second filter 5-140 has a maximum value, and thus the second filter 5-140 highly attenuates signals in the first frequency band. At the frequency in the first frequency band, the total impedance of the fourth filter 542 has a minimum value. In an embodiment, the fourth filter 542 has substantially the same configuration as that of the first filter 5-120 except that a first terminal of the fourth filter 542 is connected to the RX circuit 5-150 and a second terminal of the fourth filter 542 is connected to the ground. Thus, even assuming that a portion of the signals in the first frequency band passes through the second filter 5-140, the passed portion would pass through the fourth filter 542 to the ground and thus be further attenuated.

Figure 5B:
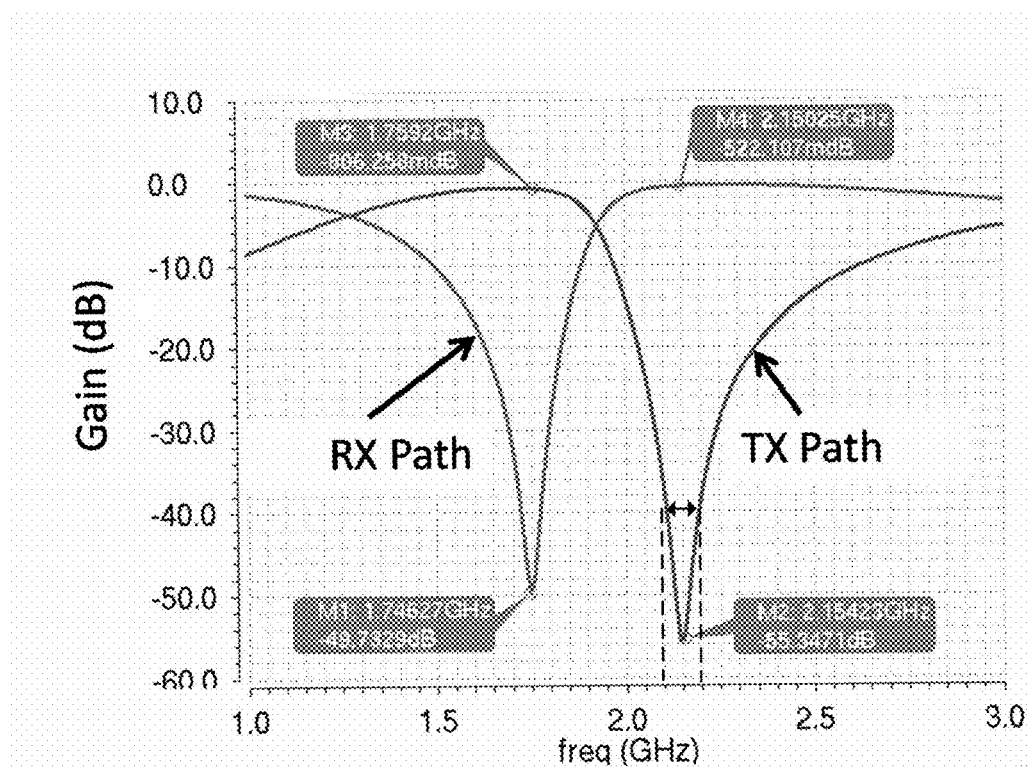
FIG. 5B illustrates frequency responses of a transmit path and a receiver path shown in FIG. 5A according to an embodiment.

FIG. 5B illustrates frequency responses of a transmit path that includes the first filter 5-120 and the third filter 541 and a receive path that includes the second filter 5-140 and the fourth filter 542 shown in FIG. 5A.

As shown in FIG. 5B, insertion losses due to the first and third filters 5-120 and 541 and the second and fourth filters 5-140 and 542 are less than 1 dB at a transmit frequency $f_T$ (e.g., 1.75 GHz) and at a receive frequency $f_R$ (e.g., 2.15 GHz), respectively. As indicated by a frequency response TX Path of the transmit path, a 2.15 GHz band signal having a bandwidth of 50 MHz can be attenuated more than 40 dB, which indicates a good isolation between the transmit path and receive path.

In an embodiment, the first to sixth inductors 5-312, 5-333, 5-331, 5-445, 5-449, and 544 have inductance values less than 3 nanohenries (nH) and the first to sixth capacitors 5-311, 5-313, 5-332, 5-443, 5-447, and 548 have capacitance values less than 6 picofarads (pF). Such inductors and capacitors, which have relatively low inductance and capacitance values, can be integrated onto an SOC.

Figure 6A:
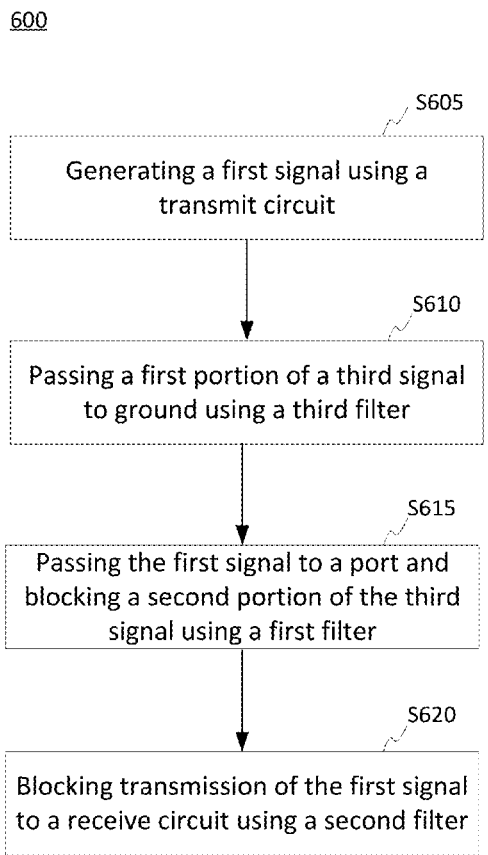
FIGS. 6A and 6B are flowcharts illustrating processes of transmitting and receiving signals, respectively, according to an embodiment.
Figure 6B:
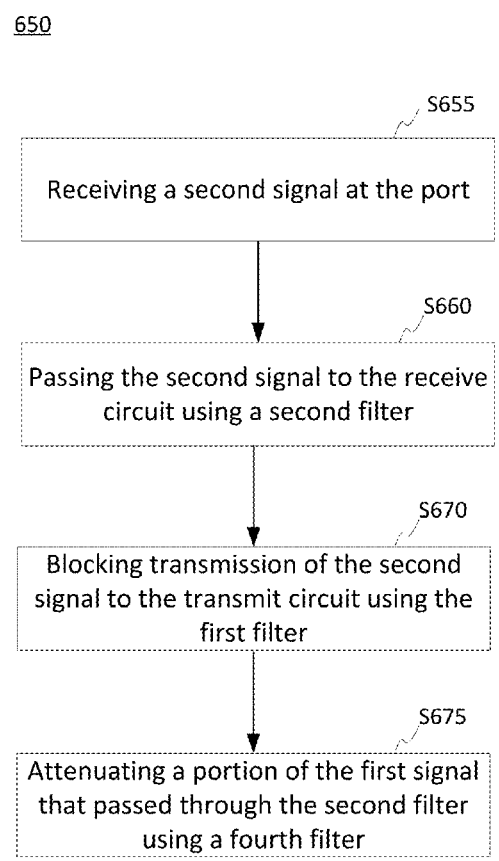

FIGS. 6A and 6B are flowcharts 600 and 650, which illustrate processes of transmitting a first signal and receiving a second signal, respectively, according to an embodiment. Each of the processes of transmitting the first signal and receiving the second signal may be performed independently or simultaneously. In an embodiment, the first signal has a first frequency in a 1.75 GHz band and the second signal has a second frequency in a 2.15 GHz band.

Referring to FIG. 6A, at S605, a TX circuit generates the first signal. The TX circuit may generate a third undesired signal (for example, noise or inter-modulation components resulting from distortion) and having a third frequency in the 2.15 GHz band.

At S610, a first filter coupled between the TX circuit and an RX circuit presents a high impedance to the third signal and a third filter provides a first portion of the third signal with a low impedance path to ground. As a result, TX-RX isolation between the TX circuit and the RX circuit is improved. In an embodiment, the third filter includes a parallel circuit having a capacitor and a first inductor and an impedance value of the parallel circuit has a maximum value at the first frequency. In an embodiment, the third filter includes the parallel circuit and a second inductor coupled to the parallel circuit in series, and an impedance value of the third filter has a minimum value at the second frequency.

At S615, the first filter passes the first signal to transmit the first signal to a port, which is connected to an antenna. The first filter receives a second portion of the third signal and attenuates the second portion of the third signal, and thus the TX-RX isolation is improved.

At S620, the second filter blocks transmission of the first signal from the port to the RX circuit by presenting a high impedance to the first signal.

Referring to FIG. 6B, at S655, the second signal is received by the antenna, which is connected to the port.

At S660, the second filter passes the second signal received from the port to the RX circuit.

At S670, the first filter blocks transmission of the second signal from the port to the TX circuit.

At S675, a fourth filter further attenuates a portion of the first signal that passed through the second filter. In an embodiment, the fourth filter includes a parallel circuit having a first capacitor and an inductor, and an impedance value of the parallel circuit has a maximum value at the second frequency. In an embodiment, the fourth filter includes the parallel circuit and a second capacitor coupled to the parallel circuit in series, and an impedance value of the fourth filter has a minimum value at the first frequency.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An apparatus comprising:
a first circuit transmitting a first signal to a port, the first signal having a first frequency;
a second circuit receiving a second signal from the port, the second signal having a second frequency;
a first peak-notch filter coupled between the port and the first circuit, and configured to pass the first signal and block the second signal;
a second peak-notch filter coupled between the port and the second circuit, and configured to pass the second signal and block the first signal; and
a third filter coupled between an input of the first filter and a ground, the third filter including a parallel circuit having a capacitor and an inductor that are connected in parallel, the parallel circuit having a maximum impedance value at the first frequency,
wherein the first circuit generates a third signal, the third signal being an undesired signal and having a third frequency, the third frequency and the second frequency being in a common frequency band, and the third filter provides a path to the ground to a portion of the third signal.

2. The apparatus of claim 1, wherein an impedance presented to the third signal by the third filter is smaller than an impedance presented to the third signal by the first filter, and wherein the first filter receives a second portion of the third signal and attenuates the second portion of the third signal.

3. The apparatus of claim 2, wherein the third filter is a peak-notch filter having a maximum impedance value at the first frequency and a minimum impedance value at the second frequency.

4. The apparatus of claim 1, wherein the inductor is a first inductor, wherein the third filter further includes a second inductor coupled to the parallel circuit in series, the third filter having a minimum impedance value at the second frequency.

5. The apparatus of claim 1, further comprising:
a fourth filter coupled between an output of the second filter and the ground, the fourth filter attenuating a portion of the first signal that passed through the second filter.

6. The apparatus of claim 5, wherein the fourth filter is a peak-notch filter having a maximum impedance value at the second frequency and a minimum impedance value at the first frequency.

7. The apparatus of claim 5, wherein the parallel circuit of the third filter is a first parallel circuit, the capacitor of the first parallel circuit is a first capacitor, the inductor of the first parallel circuit is a first inductor, and
wherein the fourth filter includes a second parallel circuit having a second capacitor and a second inductor, and the second parallel circuit having a maximum impedance value at the second frequency.

8. The apparatus of claim 7, wherein the fourth filter further includes a third capacitor coupled to the second parallel circuit in series, the fourth filter having a minimum impedance value at the first frequency.

9. The apparatus of claim 1, wherein the parallel circuit of the third filter is a first parallel circuit, the capacitor of the first parallel circuit is a first capacitor, the inductor of the first parallel circuit is a first inductor, and wherein the first peak-notch filter includes:
a second parallel circuit including a second capacitor and a second inductor; and a third capacitor coupled in series with the second parallel circuit.

10. The apparatus of claim 9, wherein the second parallel circuit has a maximum impedance value at the second frequency, and
wherein the first peak-notch filter has a minimum impedance value at the first frequency.

11. The apparatus of claim 1, wherein the parallel circuit of the third filter is a first parallel circuit, the capacitor of the first parallel circuit is a first capacitor, the inductor of the first parallel circuit is a first inductor, and
wherein the second peak-notch filter includes:
a second inductor; and
a second parallel circuit including a second capacitor and a third inductor and coupled to the first inductor in series.

12. The apparatus of claim 2, wherein the second frequency is in a 2.15 GHz band for receiving the second signal and the third frequency is in the 2.15 GHz band.

13. A method comprising:
passing a first signal using a first peak-notch filter and blocking the first signal using a second peak-notch filter, the first signal having a first frequency;
passing a second signal using the second peak-notch filter and blocking the second signal using the first peak-notch filter, the second signal having a second frequency different from the first frequency; and
passing, by a third filter, a portion of a third signal from a transmitter circuit to a ground by providing a path to the ground to the portion of the third signal an impedance presented to the third signal by the third filter being smaller than an impedance presented to the third signal by the first peak-notch filter, the third signal being an undesired signal and having a third frequency, the third frequency and the second frequency being in a common frequency band.

14. The method of claim 13, wherein the passed portion of the third signal corresponds to a first portion of the third signal, the method further comprising:
attenuating a portion of the first signal passed through the second filter using a fourth filter; and
attenuating a second portion of the third signal using the first filter.

15. The method of claim 14, wherein the third filter includes a parallel circuit having a capacitor and an inductor, the method further comprising:
maximizing an impedance value of the parallel circuit at the first frequency.

16. The method of claim 15, wherein the inductor is a first inductor and the third filter further includes a second inductor coupled to the parallel circuit in series, the method further comprising:
minimizing an impedance value of the third filter at the second frequency.

17. The method of 14, wherein the fourth filter includes a parallel circuit having a capacitor and an inductor, the method further comprising:
maximizing an impedance value of the parallel circuit at the second frequency.

18. The method of claim 17, wherein the capacitor is a first capacitor and the fourth filter further includes a second capacitor coupled to the parallel circuit in series, the method further comprising:

minimizing an impedance value of the fourth filter at the first frequency.

19. An apparatus comprising: a first circuit transmitting a first signal to a port, the first signal having a first frequency;
- a second circuit receiving a second signal from the port, the second signal having a second frequency;
- a first peak-notch filter coupled between the port and the first circuit, and configured to pass the first signal and block the second signal;
- a second peak-notch filter coupled between the port and the second circuit, and configured to pass the second signal and block the first signal; and
- a third filter coupled between an input of the first filter and a ground, wherein the first circuit generates a third signal, the third signal being an undesired signal and having a third frequency, the third frequency and the second frequency being in a common frequency band, and
- wherein the third filter provides a path to the ground to a portion of the third signal, and an impedance presented to the third signal by the third filter is smaller than an impedance presented to the third signal by the first filter.

* * * * *